United States Patent [19]

Evers

[11] 4,359,567
[45] Nov. 16, 1982

[54] THERMOOXIDATIVELY STABLE ARTICULATED P-BENZOBISOXAZOLE AND P-BENZOBISTHIAZOLE POLYMERS

[75] Inventor: Robert C. Evers, Dayton, Ohio

[73] Assignee: The United States of America as represented by the Secretary of the Air Force, Washington, D.C.

[21] Appl. No.: 307,991

[22] Filed: Oct. 2, 1981

[51] Int. Cl.$^3$ .................. C08G 73/22; C08G 75/32
[52] U.S. Cl. .................................. 528/179; 528/184; 528/185; 528/207; 528/208; 528/210; 528/211; 528/336; 528/337; 528/339; 528/341
[58] Field of Search ............... 528/184, 185, 337, 172, 528/179, 207, 208, 210, 211, 336, 339, 341

[56] References Cited

U.S. PATENT DOCUMENTS

| | | | |
|---|---|---|---|
| 3,313,783 | 4/1967 | Iwakura et al. | 528/337 |
| 4,064,109 | 12/1977 | Evers | 260/61 |
| 4,084,048 | 4/1978 | Naarmann et al. | 526/260 |
| 4,115,367 | 9/1978 | Evers | 528/210 |
| 4,142,037 | 2/1979 | Evers et al. | 528/210 |
| 4,147,858 | 4/1979 | Evers | 528/210 |
| 4,229,566 | 10/1980 | Evers et al. | 528/185 |

*Primary Examiner*—Lester L. Lee
*Attorney, Agent, or Firm*—Donald J. Singer; Thomas L. Kundert

[57] ABSTRACT

Articulated p-benzobisoxazole and p-benzobisthiazole polymers which contain a limited number of 3,3'-biphenyl or 2,2'-bipyridyl segments are synthesized, with inherent viscosities as high as 14 dl/g being recorded. The 3,3'-biphenyl or 2,2'-bipyridyl segments in the p-benzobisoxazole and p-benzobisthiazole polymers impart flexibility to the polymers without adversely affecting the thermooxidative stability. While the resultant articulated polymers exhibit liquid crystalline behavior in methanesulfonic acid and form strong cast films from that solvent, they also exhibit thermooxidative stability comparable to other p-benzobisthiazole and p-benzobisoxazole polymers. The resultant films are useful for the fabrication of high strength laminates to be used in severe environment structural applications.

6 Claims, No Drawings

THERMOOXIDATIVELY STABLE ARTICULATED P-BENZOBISOXAZOLE AND P-BENZOBISTHIAZOLE POLYMERS

RIGHTS OF THE GOVERNMENT

The invention described herein may be manufactured and used by or for the Government of the United States for all governmental purposes without the payment of any royalty.

FIELD OF THE INVENTION

The present invention relates in general to polymers, and in particular to new and useful p-benzobisoxazole and p-benzobisthiazole polymers which contain 3,3'-biphenyl or 2,2'-bipyridyl segments.

BACKGROUND OF THE INVENTION

As described in the literature, p-benzobisoxazole and p-benzobisthiazole polymers can be synthesized with inherent viscosities of up to 31 dl/g. These polymers possess high thermooxidative stability and, because of their all-para, rod-like character, they are capable of forming liquid crystalline phases in concentrated solutions of methanesulfonic acid. Ultra-high strength, high modulus fibers possessing a high degree of oriented, crystalline character can be obtained from these solutions. However, attempts to cast strong films from the methanesulfonic acid solutions have been unsuccessful. It has been possible to obtain only very brittle films. Articulated p-benzobisoxazole and p-benzobisthiazole polymers which contain a limited number of diphenoxybenzene segments can be synthesized with inherent viscosities as high as 12 dl/g being recorded (See my joint U.S. Pat. No. 4,229,566). These are also capable of forming liquid crystalline phases in methanesulfonic acid and can be cast into strong films from that solvent. However, the presence of the diphenoxybenzene segments, while improving the film-forming properties of the p-benzobisoxazole and p-benzobisthiazole polymers, also significantly decreases the thermooxidative stability of the polymers.

It is a principal object of this invention, therefore, to provide thermooxidative stable articulated p-benzobisoxazole and p-benzobisthiazole polymers which can be used to fabricate films and laminates having high strength and outstanding thermooxidative stability.

Another object of the invention is to provide articulated p-benzobisoxazole and p-benzobisthiazole polymers containing 3,3'-biphenyl and 2,2'-bipyridyl structures.

A further object of the invention is to provide a process for preparing the articulated p-benzobisoxazole and p-benzobisthiazole polymers containing 3,3'-biphenyl and 2,2'-bipyridyl structures.

Still another object of the invention is to provide films prepared from articulated p-benzobisoxazole and p-benzobisthiazole polymers containing 3,3'-biphenyl and 2,2'-bipyridyl structures.

Other objects and advantages of the invention will become apparent to those skilled in the art upon consideration of the accompanying disclosure.

SUMMARY OF THE INVENTION

The present invention resides in a polymer composition including articulated p-benzobisoxazole and p-benzobisthiazole polymers which contain a limited number of 3,3'-biphenyl or 2,2'-bipyridyl segments. These polymers have inherent viscosities as high as 14 dl/g. The polymers are capable of forming liquid crystalline phases in methanesulfonic acid and can be cast into strong films. The polymers include either 3,3'-biphenyl or 2,2'-bipyridyl segments to impart flexibility to the polymer chains without decreasing the thermooxidative stability of the polymers. While p-benzobisoxazole and p-benzobisthiazole polymers which do not have 3,3'-biphenyl or 2,2'-bipyridyl segments form extremely brittle cast films, the presence of such segments improves the film forming properties of the polymers. Examples of such 3,3'-biphenyl or 2,2'-bipyridyl free polymers are poly([benzo(1,2-d:5,4-d')bisoxazole-2,6-diyl]-1,4-phenylene) and poly([benzo(1,2-d:4,5-d')bisthiazole-2,6-diyl]-1,4-phenylene).

The invention can be represented by either of the two formulas I and II:

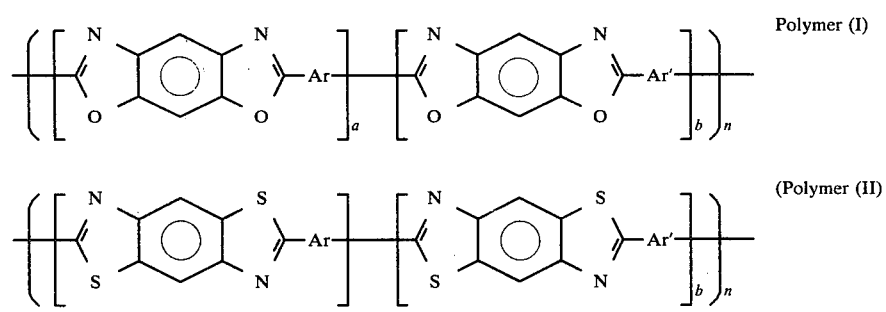

where Ar is

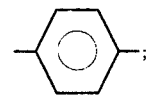

Ar' is

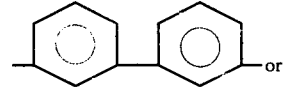

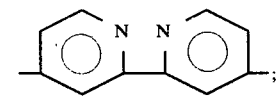

a ranges from about 0.80 to 0.97, b ranges from about 0.03 to 0.20, and the sum of a and b equals 1; and n is an integer equal to the number of repeating units. In general, the number of repeating units is such that the polymer has an inherent viscosity of 2 to 14 dl/g as determined in methanesulfonic acid at 25° C.

As seen from the foregoing, the polymers of this invention are characterized by having p-benzobisoxazole or p-benzobisthiazole units, and 3,3'-biphenyl or 2,2'-bipyridyl units. The latter units are believed to function as "swivels" in the polymer chains so that their presence in a limited or predetermined amount imparts flexibility to the chains. Thus, the structure of the polymer makes it possible to cast strong, thermooxidatively stable films from solutions while retaining the capability to exhibit liquid crystalline behavior.

DESCRIPTION OF THE PREFERRED EMBODIMENTS

In one embodiment, the present invention resides in a process for preparing the articulated para-oriented polymers. Thus, the polymers are synthesized by the polycondensation of terephthalic acid, 4,6-diaminoresorcinol dihydrochloride or 2,5-diamino-1,4-benzenedithiol dihydrochloride, and a difunctional 3,3'-biphenyl or 2,2'-bipyridyl monomer. The condensation reactions involved are illustrated by the following equation:

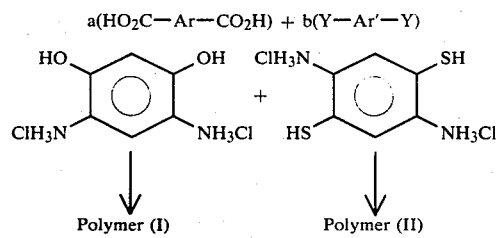

In the foregoing equation, Ar, Ar', a and b are as defined above while Y is $CO_2H$ or $COCl$.

Reaction I
(1.00)

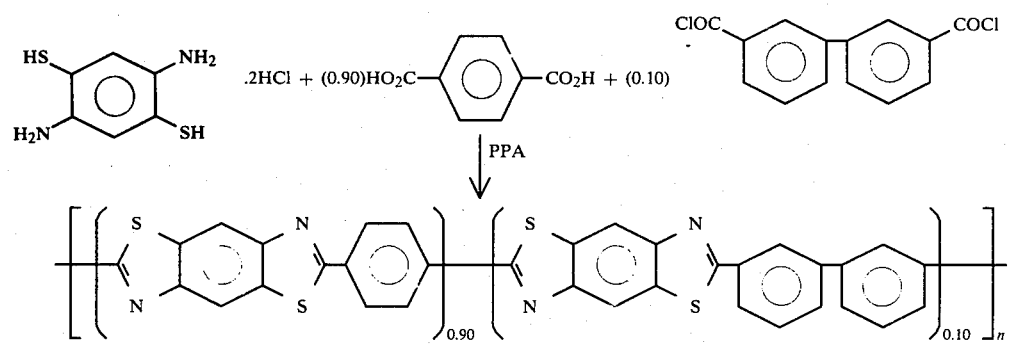

In conducting the process, 4,6-diaminoresorcinol dihydrochloride or 2,5-diamino-1,4-benzenedithiol dihydrochloride and the terephthalic acid are mixed with polyphosphoric acid. The polyphosphoric acid functions as a solvent and also acts to dehydrochlorinate the amino monomer. The mixture is heated in an inert gas atmosphere at a temperature of about 70° to 130° C., over a period of about 3 to 24 hours. Included among inert gases that can be employed are nitrogen, argon, and helium. At the end of this period, the difunctional 3,3'-biphenyl or 2,2'-bipyridyl monomer is added together with an additional amount of polyphosphoric acid as required to provide a stirrable mixture. An equimolar amount of the amino monomer as compared to the combined amount of the terephthalic acid and difunctional 3,3'-biphenyl or 2,2'-bipyridyl is generally used. The amount of polyphosphoric acid used is that which is sufficient to provide a stirrable mixture. In general, the concentration of monomers in the polyphosphoric acid usually ranges from about 0.5 to 12.0 percent.

The reaction mixture is heated at a temperature in the range of about 150° to 225° C. for a period ranging from 36 to 96 hours. In a preferred procedure, the reaction temperature is increased gradually during the reaction period, e.g., 150° C. for 16 hours, 185° C. for 2 hours, 195° C. for 20 hours and 210° C. for 12 hours. At the end of the reaction period, the polymer solution is generally in a very viscous or solid state. After cooling, the product is washed repeatedly with water while stirring, after which it is extracted with water over a period of about 12 to 36 hours. After drying under a vacuum at an elevated temperature, a purified polymer of high molecular weight is obtained.

A more complete understanding of the invention can be obtained by referring to the following illustrative examples which are not intended, however, to be unduly limitative of the invention.

EXAMPLE I

A typical preparative procedure for the synthesis of articulated poly-p-benzobisthiazoles containing 3,3'-biphenyl or 2,2'-bipyridyl segments is as follows:

For Reaction I, water-white polyphosphoric acid (PPA) was prepared by the addition of portions of phosphorous pentoxide (330 g) to vigorously stirred 85% phosphoric acid (217 g) which was cooled by means of an ice-bath. Addition took place under nitrogen over a thirty minute period. The ice bath was then removed and the viscous slurry heated with stirring to 150° C. After six hours, the clear, homogenous polyphosphoric acid was ready for use in the polycondensation reaction.

Terephthalic acid (0.7476 g, 4.50 mmol) and 2,5-diamino-1,4-benzenedithiol dihydrochloride (1.2260 g, 5.00 mmol) was stirred with 100 g of polyphosphoric acid at room temperature under nitrogen for an hour. The viscous white slurry was then heated at 70° C. for an hour to effect dehydrochorination and the temperature was then gradually raised, over two hours, to 130° C. 3,3'-biphenyl dicarboxylic acid chloride (0.1396 g, 0.50 mmol) and an additional 100 g of polyphosphoric acid were added and stirring was continued as the temperature was raised to 150° C. over the course of two hours. The resultant clear orange solution was then heated with stirring as follows: 150° C. for 16 hours, 185° C. for 2 hours; 195° C. for 20 hours and 210° C. for 12 hours. After several hours at 195° C., the viscous reaction mixture was climbing the stirrer shaft and stirring was not effective. The cooled polymerization mixture was added to a liter of water in a blender. The precipitated polymer was vigorously washed three times with water in the blender and was extracted with water in a continuous extraction apparatus for three days. Drying at room temperature/0.01 mm Hg for 16 hours and 188° C./0.01 mm Hg for 4 hours yielded 1.21 g (88% yield) of fibrous yellow-orange polymer $\eta_{inh}=7.68$ dl/g (methanesulfonic acid, 25° C., 0.2 g/dl).

Analysis Calc'd for $(C_{14}H_6N_2S_2)_{0.90}(C_{20}H_{10}N_2S_2)_{0.10}$: C,64.01; H,2.35; N,10.22; S,23.41. Found: C,65,20; H,1.91; N,9.51; S,22.00.

A two percent solution (w/v) of the polymer in methanesulfonic acid was placed in a mold and the solvent removed under reduced pressure at 60° C. The pale yellow film which formed was rinsed with water and dried at room temperature/0.10 mm Hg overnight. It exhibited birefringence under polarized light and had a tensile strength of 6900 psi and a modulus of 259,000 psi. By comparison, films prepared by this method from poly-p-benzobisthiazole which is void of the 3,3'-biphenyl structure were so brittle as to preclude physical testing to obtain modulus and tensile strength values.

Isothermal aging of the polymer at 316° C. (600° F.) in air indicated a weight loss after 200 hours of two percent. This is indicative of thermooxidative stability comparable to poly-p-benzobisthiazole. In contrast, the thermooxidative stability of the analogous articulated poly-p-benzobisthiazole containing diphenoxybenzene segments is considerably lower as indicated by a weight loss of nine percent after isothermal aging under the same conditions for 200 hours.

A series of articulated poly-p-benzobisthiazoles containing various proportions of the 3,3'-biphenyl or 2,2'-bipyridyl structure was synthesized in a manner similar to that described above. Pertinent details are summarized in Table I. It is to be noted that these polymers could be cast into films superior to those obtained from the polymer void of the 3,3'-biphenyl structure; i.e., poly([benzo(1,2-d:4,5-d')bisthiazole-2,6-diyl]-1,4-phenylene).

TABLE I

Synthesis of Articulated Poly-p-benzobisthiazoles

| Trial No. | Mole Proportion | Ar | X | Monomer Conc. (w/v)-% | $\eta_{inh}$ dl/g |
|---|---|---|---|---|---|
| 1 | 0.95 | –⌬– | $CO_2H$ | 0.99 | 7.93 |
|   | 0.05 | –⌬–⌬– | COCl |  |  |
| 2 | 0.95 | –⌬– | $CO_2H$ | 0.99 | 6.43 |
|   | 0.05 | –⌬–⌬– | $CO_2H$ |  |  |
| 3 | 0.95 | –⌬– | $CO_2H$ | 2.07 | 14.41 |
|   | 0.05 | (meta-phenylene) | COCl |  |  |
| 4 | 0.95 | –⌬– | $CO_2H$ | 3.43 | 6.81 |

TABLE I-continued
Synthesis of Articulated Poly-p-benzobisthiazoles
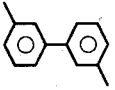
.2HCl + X—Ar—X $\xrightarrow{PPA}$
| Trial No. | Mole Proportion | Ar | X | Monomer Conc. (w/v)-% | $\eta_{inh}$- dl/g |
|---|---|---|---|---|---|
| | 0.05 | 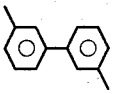 | COCl | | |
| 5 | 0.95 |  | CO$_2$H | 7.15 | 5.25 |
| | 0.05 | 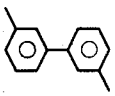 | CO$_2$H | | |
| 6 | 0.90 |  | CO$_2$H | 1.06 | 7.68 |
| | 0.10 | 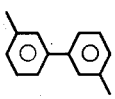 | COCl | | |
| 7 | 0.90 |  | CO$_2$H | 2.52 | 4.60 |
| | 0.10 | 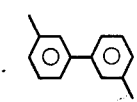 | CO$_2$H | | |
| 8 | 0.90 |  | CO$_2$H | 10.41 | 4.41 |
| | 0.10 | 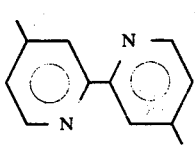 | CO$_2$H | | |
| 9 | 0.95 |  | CO$_2$H | 1.65 | 8.01 |
| | 0.05 | (bipyridyl structure) | COCl | | |
| 10 | 0.90 | (phenyl) | CO$_2$H | 1.93 | 6.04 |

TABLE I-continued
Synthesis of Articulated Poly-p-benzobisthiazoles

HS—C6H3(NH2)(NH2)(SH)·2HCl + X—Ar—X $\xrightarrow{PPA}$ [poly-p-benzobisthiazole-Ar]$_n$

| Trial No. | Mole Proportion | Ar | X | Monomer Conc. (w/v)-% | $\eta_{inh}$ dl/g |
|---|---|---|---|---|---|
|  | 0.10 | (bipyridyl) | COCl |  |  |
| 11 | 0.85 | (phenyl) | CO$_2$H | 1.52 | 5.68 |
|  | 0.15 | (bipyridyl) | COCl |  |  |
| 12 | 0.80 | (phenyl) | CO$_2$H | 0.86 | 4.97 |
|  | 0.10 | (bipyridyl) | COCl |  |  |

EXAMPLE II

A typical preparative procedure for the synthesis of articulated poly-p-benzobisoxazoles containing 3,3'-biphenyl segments is as follows:

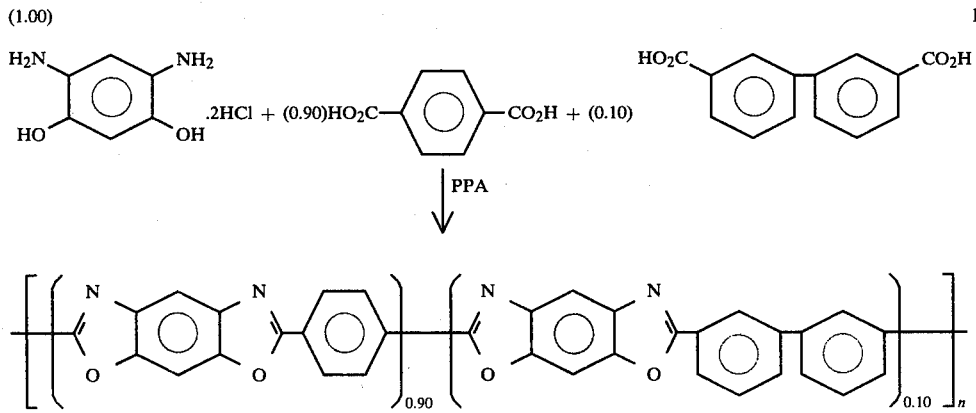

Reaction II

A slurry of terephthalic acid (0.7478 g, 4.50 mmol) and 4,6-diaminoresorcinol dihydrochloride (1.0658 g, 5.00 mmol) in 145 g of freshly prepared polyphosphoric acid was stirred under nitrogen at 90°–110° C. for four hours to effect dehydrochlorination. The temperature was raised to and held at 130° C. for 20 hours. 3,3'-Biphenyl dicarboxylic acid (0.1217 g, 0.50 mmol) and 40 g of polyphosphoric acid were added to the clear yellow solution and the resultant slurry heated at 150° C. for 16 hours. The clear red reaction mixture was then heated at 170° C. for 7 hours, 185° C. for 16 hours and 195° C. for 26 hours. Addition of the cooled extremely viscous solution to water gave fibrous polymer which was vigorously washed three times with water in a blender and extracted for three days with water in a continuous extraction apparatus. Drying at room temperature/0.01 mm Hg for 16 hours and 145° C./0.01 mm Hg for 7 hours yielded 1.09 g (90% yield) of pale yellow polymer; $\eta_{inh}$=5.24 dl/g (methanesulfonic acid, 25° C. 0.2 g/dl).

Anal.Calcd for $(C_{14}H_6N_2O_2)_{0.90}(C_{20}H_{10}N_2O_2)_{0.10}$: C, 72.52; H,2.67; N,11.58. Found: C,72.63; H,2.21; N,11.55.

A deep yellow film of the polymer was cast from methanesulfonic acid by a procedure similar to that described above for the articulated poly-p-benzobisthiazole. It also exhibited birefringence under polarized light and had a tensile strength of 13,600 psi and a modulus of 504,000 psi. By comparison, films prepared by this method from poly-p-benzobisoxazole which was void of the 3,3'-biphenyl structure were so brittle as to preclude physical testing to obtain modulus and tensile strength values.

Isothermal aging of the polymer in air at 316° C. (600° F.) led to a weight loss of 8 percent after 200 hours. This weight loss is comparable to that exhibited by poly-p-benzobisoxazole under identical conditions. However, the thermooxidative stability of the analogous articulated poly-p-benzobisthiazole containing diphenoxybenzene segments is considerably lower as indicated by a weight loss of seventeen percent after isothermal aging in air at 316° C. (600° F.) for 200 hours.

A series of articulated poly-p-benzobisoxazoles containing various proportions of 3,3'-biphenyl or 2,2'-bipyridyl structure was synthesized in a manner similar to that described previously. Pertinent details are summarized in Table II. It is to be noted that these polymers could be cast into films superior to those obtained from the polymer void of the 3,3'-biphenyl structure; i.e., poly([benzo(1,2-d;5,4-d')bisoxazole-2,6-dyl]-1,4-phenylene).

TABLE II

Synthesis of Articulated Poly-p-benzobisoxazoles

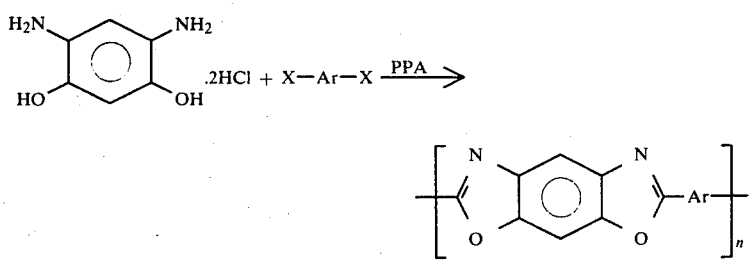

| Trial Nr. | Mole Proportion | Ar | X | Monomer Conc. (w/v)-% | $\eta_{inh}$-dl/g |
|---|---|---|---|---|---|
| 1 | 0.97 | phenylene | $CO_2H$ | 0.95 | 7.27 |
|   | 0.03 | biphenyl | COCl |   |   |
| 2 | 0.95 | phenylene | $CO_2H$ | 0.92 | 6.92 |
|   | 0.05 | biphenyl | $CO_2H$ |   |   |
| 3 | 0.90 | phenylene | $CO_2H$ | 1.16 | 6.81 |
|   | 0.10 | biphenyl | COCl |   |   |
| 4 | 0.90 | phenylene | $CO_2H$ | 1.03 | 5.24 |
|   | 0.10 | biphenyl | $CO_2H$ |   |   |
| 5 | 0.95 | phenylene | $CO_2H$ | 1.37 | 4.07 |

TABLE II-continued
Synthesis of Articulated Poly-p-benzobisoxazoles

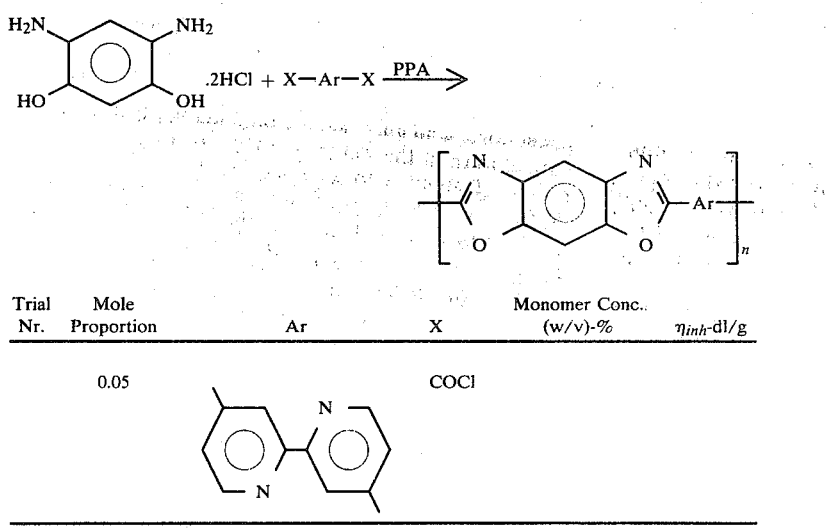

| Trial Nr. | Mole Proportion | Ar | X | Monomer Conc. (w/v)-% | $\eta_{inh}$-dl/g |
|---|---|---|---|---|---|
| | 0.05 | (structure) | COCl | | |

As seen from the foregoing, the present invention provides thermooxidatively stable articulated p-benzobisthiazole and p-benzobisoxazole polymers containing 3,3'-biphenyl or 2,2'-bipyridyl segments. The presence of these segments or "swivels" in the polymer chains permits strong films to be cast from methane-sulfonic acid solutions.

The polymers exhibit very high inherent viscosities and the films cast from the polymer solutions possess superior mechanical properties. The films are particularly useful for the fabrication of high strength laminates to be used in severe environmental structural applications.

While specific embodiments of the invention have been shown and described in detail to illustrate the application of the principles of the invention, it will be understood that the invention may be embodied otherwise without departing from such principles.

I claim:

1. A thermooxidatively stable articulated polymer consisting essentially of recurring units having one of the following formulae:

Formula I

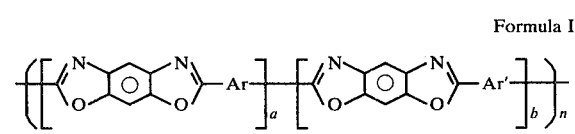

Formula II

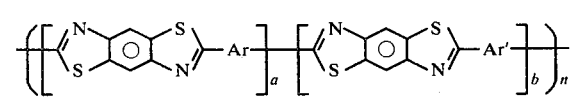

wherein Ar is a phenylene radical, Ar' is selected from the group consisting of biphenylene and bipyridylene radicals, and wherein the molar proportion of a ranges from about 0.80 to 0.97, b ranges from about 0.03 to 0.20, and the sum of a and b equals one.

2. A polymer according to claim 1, comprising p-benzobisoxazole wherein Ar' is chosen from

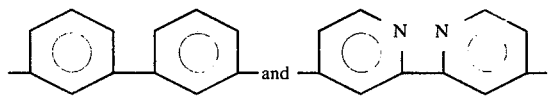

3. A polymer according to claim 1, comprising p-benzobisthiazole wherein Ar' is chosen from

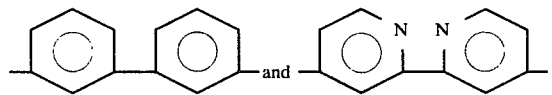

4. A method for preparing a thermooxidatively stable articulated polymer consisting essentially of recurring units having one of the following formulae:

Formula I

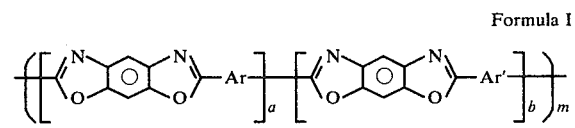

Formula II

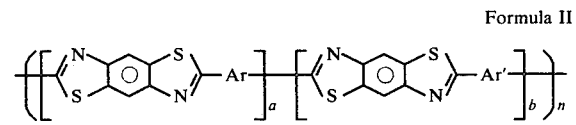

wherein Ar is a phenylene radical, Ar' is selected from the group consisting of biphenylene and bipyridylene radicals, and wherein the molar proportion of a ranges from 0.80 to 0.97, b ranges from 0.03 to 0.20, and the sum of a plus b equals one, comprising: combining one of 2,5-diamino-1,4-benzenedithiol dihydrochloride and 4,6-diamino-resorcinol dihydrochloride, with an equimolar amount of the combination of terephthalic acid and one of 3,3'-biphenyl dicarboxylic acid chloride, 3,3'-biphenyl dicarboxylic acid and 2,2'-bipyridyl-4,4'-dicarboxylic acid chloride, in the presence of polyphosphoric acid, wherein the molar ratio of said terephthalic acid to said Ar' moieties is in the approximate range of 0.80:0.20 to 0.97:0.03.

5. A method according to claim 4 including heating the combination of ingredients in the presence of polyphosphoric acid to form a viscous reaction mixture, cooling the viscous reaction mixture and washing the viscous reaction mixture with water to extract the polymer.

6. The method of claim 4 wherein said diamino compound and said terephthalic acid are mixed with polyphosphoric acid and the resulting mixture is heated to a temperature in the range of about 70° to 130° C. for a period of about 3 to 24 hours, said difunctional 3,3'-biphenyl or 2,2'-bipyridyl monomer is thereafter added to the reaction mixture, and the resulting mixture is heated to a temperature in the range of about 150° to 225° C. for a period of about 36 to 96 hours.

* * * * *